United States Patent
Shi et al.

(10) Patent No.: US 11,088,898 B2
(45) Date of Patent: Aug. 10, 2021

(54) UPDATING LOGGING BEHAVIOR OF A COMPUTER SYSTEM USING COLLABORATION WITHIN INTERCONNECTED SYSTEMS

(71) Applicant: International Business Machines Corporation, Armonk, NY (US)

(72) Inventors: Peng Shi, Tucson, AZ (US); Louie A. Dickens, Tucson, AZ (US); Paul Cross, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/386,114

(22) Filed: Apr. 16, 2019

(65) Prior Publication Data

US 2020/0336357 A1    Oct. 22, 2020

(51) Int. Cl.
| | |
|---|---|
| *H04L 12/24* | (2006.01) |
| *G06F 16/955* | (2019.01) |
| *H04L 29/08* | (2006.01) |
| *H04L 29/06* | (2006.01) |

(52) U.S. Cl.
CPC ........ *H04L 41/069* (2013.01); *G06F 16/9566* (2019.01); *H04L 67/02* (2013.01); *H04L 69/16* (2013.01)

(58) Field of Classification Search
CPC ....... H04L 41/069; H04L 67/02; H04L 69/16; G06F 16/9566
USPC .......................................................... 709/224
See application file for complete search history.

(56) References Cited

U.S. PATENT DOCUMENTS

| | | | |
|---|---|---|---|
| 6,263,370 B1 | 7/2001 | Kirchner et al. | |
| 8,983,896 B2 | 3/2015 | von Kaenel et al. | |
| 10,073,979 B2 | 9/2018 | Von Kaenel et al. | |
| 2006/0174165 A1 | 8/2006 | Shaffer et al. | |
| 2011/0067008 A1 | 3/2011 | Srivastava et al. | |
| 2016/0082352 A1* | 3/2016 | Oku ........................ | G06F 21/64 |
| | | | 463/29 |

(Continued)

OTHER PUBLICATIONS

IBM, "Networking on z/OS," IBM, z/OS Basic Skills Information Center, 2010, pp. 1-256.

(Continued)

*Primary Examiner* — Joseph L Greene
(74) *Attorney, Agent, or Firm* — Zilka-Kotab, P.C.

(57) ABSTRACT

A computer-implemented method according to one embodiment includes outputting, from a requester system to a server system, a request signature. The request signature requests at least one parameter of a function specified in the request signature. The method further includes receiving a first response signature from the server system and identifying within the first response signature a parameter. The specified function is applied to the identified parameter for determining whether the parameter is valid. In response to a determination that the identified parameter of the first response signature is invalid, a location and/or an identity of the identified parameter is marked in a copy of the first response signature. The method further includes using a functional topology of the requester system to trace the identified parameter determined to be invalid to a valid parameter, and outputting a second response signature that includes the marked-up copy of the first response signature.

19 Claims, 9 Drawing Sheets

(56) References Cited

U.S. PATENT DOCUMENTS

| | | |
|---|---|---|
| 2016/0092295 A1 | 3/2016 | Rajkovic et al. |
| 2016/0173623 A1* | 6/2016 | Broussard ............... H04L 67/42 713/168 |
| 2018/0004623 A1* | 1/2018 | Krishnamoorthy .......................... G06F 11/3034 |
| 2018/0285563 A1* | 10/2018 | Browne .................. G06F 21/54 |
| 2019/0260577 A1* | 8/2019 | Ren ..................... H04L 61/2046 |
| 2019/0342738 A1* | 11/2019 | Gao ...................... H04W 76/14 |

OTHER PUBLICATIONS

Microsoft, "Utilizing a Globally Unique Identifier to Monitor Connection Requests," IP.com Prior Art Database Technical Disclosure, IPCOM000159159D, Oct. 10, 2007, pp. 1-7.

Anonymous, "Dynamic switch over of signing state in distributed file-system clients," IP.com Prior Art Database Technical Disclosure, IPCOM000239700D, Nov. 26, 2014, pp. 1-12.

* cited by examiner

UPDATING LOGGING BEHAVIOR OF A COMPUTER SYSTEM USING COLLABORATION WITHIN INTERCONNECTED SYSTEMS

BACKGROUND

The present invention relates to logging information for error troubleshooting, and more specifically, this invention relates to updating logging behavior of a computer system using collaboration within interconnected systems.

A plurality of systems/components/modules are often connected/paired with one another to form a network. During use of inter-connected systems/components/modules, technical errors may arise. In order to mitigate a technical error, troubleshooting is typically performed on the system/component/module that contains the error, often using information from logs.

SUMMARY

A computer-implemented method according to one embodiment includes outputting, from a requester system to a server system, a request signature. The request signature requests at least one parameter of a function specified in the request signature. Moreover, the specified function exists in a functional topology of the requester system and a functional topology of the server system. The method further includes receiving a first response signature from the server system and identifying within the first response signature a parameter. The specified function is applied to the identified parameter for determining whether the identified parameter is valid. In response to a determination that the identified parameter of the first response signature is invalid, a location and/or an identity of the identified parameter determined to be invalid is marked in a copy of the first response signature. The method further includes using the functional topology of the requester system to trace and/or map the identified parameter determined to be invalid to a valid parameter, and outputting, from the requester system to the server system, a second response signature that includes the marked-up copy of the first response signature for updating logging behavior of the server system when the server system thereafter performs the specified function.

A computer program product for enabling an updating of logging behavior of a computer system using collaboration within interconnected systems according to another embodiment includes a computer readable storage medium having program instructions embodied therewith. The program instructions are readable and/or executable by a computer included in a requester system to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
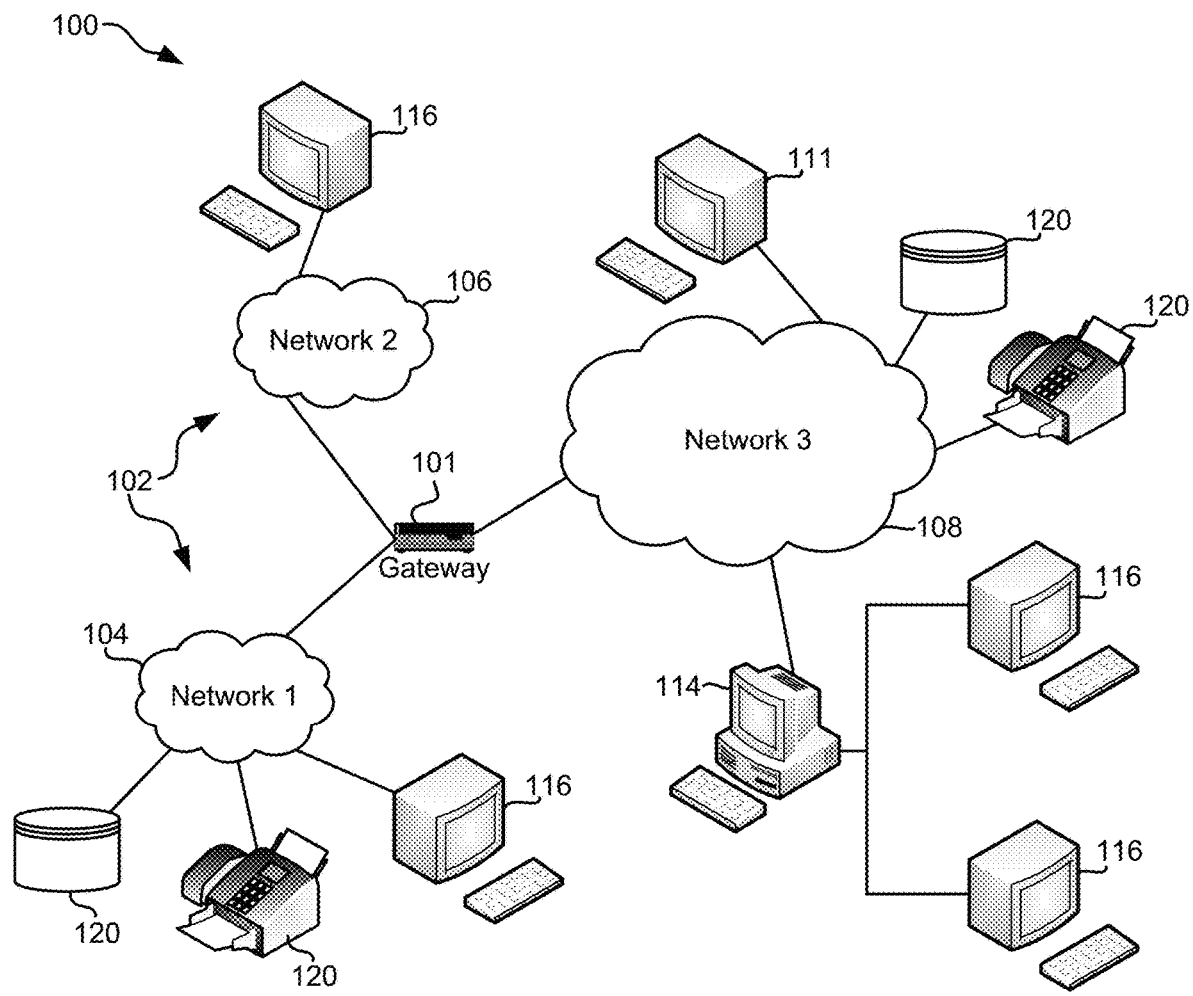
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for updating logging behavior of a server system using collaboration within interconnected systems.

In one general embodiment, a computer-implemented method includes outputting, from a requester system to a server system, a request signature. The request signature requests at least one parameter of a function specified in the request signature. Moreover, the specified function exists in a functional topology of the requester system and a functional topology of the server system. The method further includes receiving a first response signature from the server system and identifying within the first response signature a parameter. The specified function is applied to the identified parameter for determining whether the identified parameter is valid. In response to a determination that the identified parameter of the first response signature is invalid, a location and/or an identity of the identified parameter determined to be invalid is marked in a copy of the first response signature. The method further includes using the functional topology of the requester system to trace and/or map the identified parameter determined to be invalid to a valid parameter, and outputting, from the requester system to the server system, a second response signature that includes the marked-up copy of the first response signature for updating logging behavior of the server system when the server system thereafter performs the specified function.

In another general embodiment, a computer program product for enabling an updating of logging behavior of a computer system using collaboration within interconnected systems includes a computer readable storage medium having program instructions embodied therewith. The program instructions are readable and/or executable by a computer included in a requester system to cause the computer to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
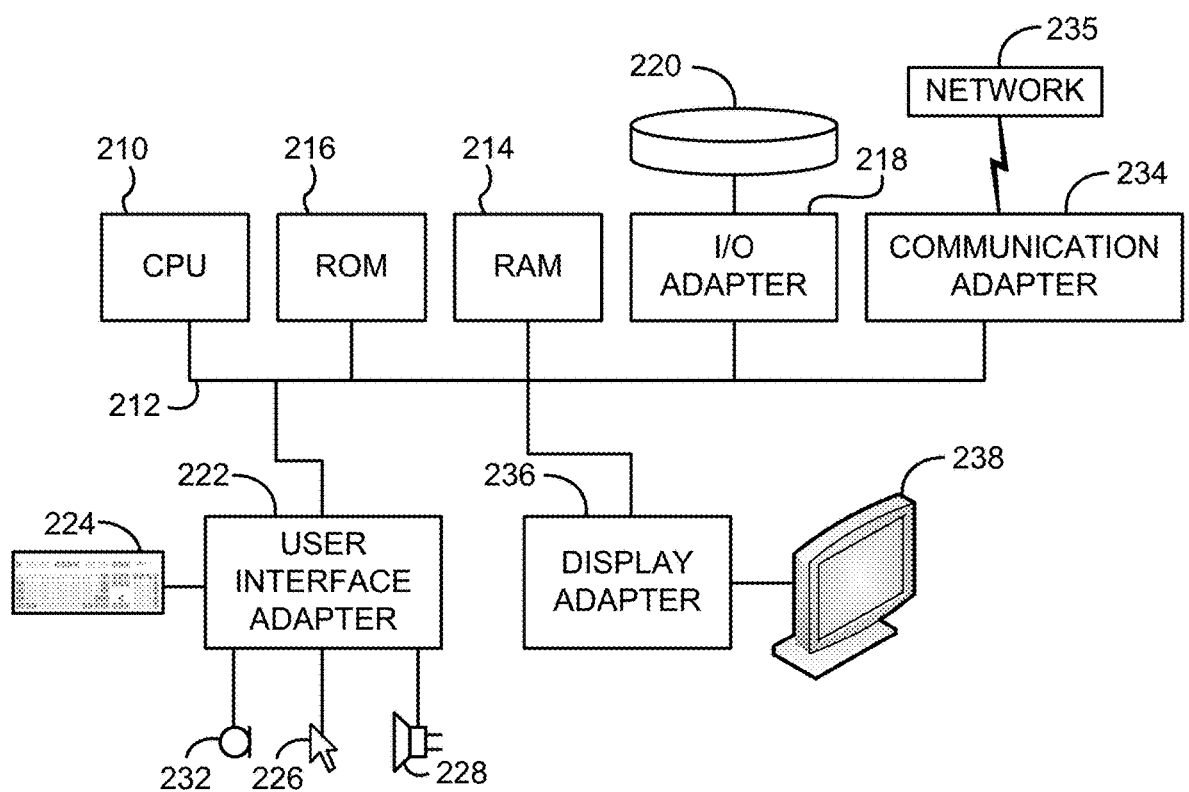
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Of course, this logic may be implemented as a method on any device and/or system or as a computer program product, according to various embodiments.

As mentioned elsewhere above, a plurality of systems/components/modules are often connected/paired with one another to form a network. During use of inter-connected systems/components/modules, technical errors may arise. In order to mitigate a technical error, troubleshooting is typically performed on the system/component/module that contains the error, often using information from logs. However, combined with performance requirements and service level agreements (SLAs), it is difficult to efficiently balance when to increase log verbosity to facilitate error troubleshooting and when to decrease log verbosity to alleviate performance impact due to incurred resource overhead from increasing system logging. Furthermore, some error troubleshooting is even further hindered where critical correlated log entries are missing from connected peers in a networking environment. This is often due to fact that relevant error contexts are not logged because the system on which relevant error contexts are vital to understanding the cause of the error(s) occurring on one or more of the system's peers, does not enable the logging for those relevant functions/components/modules.

Several embodiments and approaches described herein include identifying invalid parameters of a server system for updating the targeted scope of logging collection on the server system.

Figure 3:
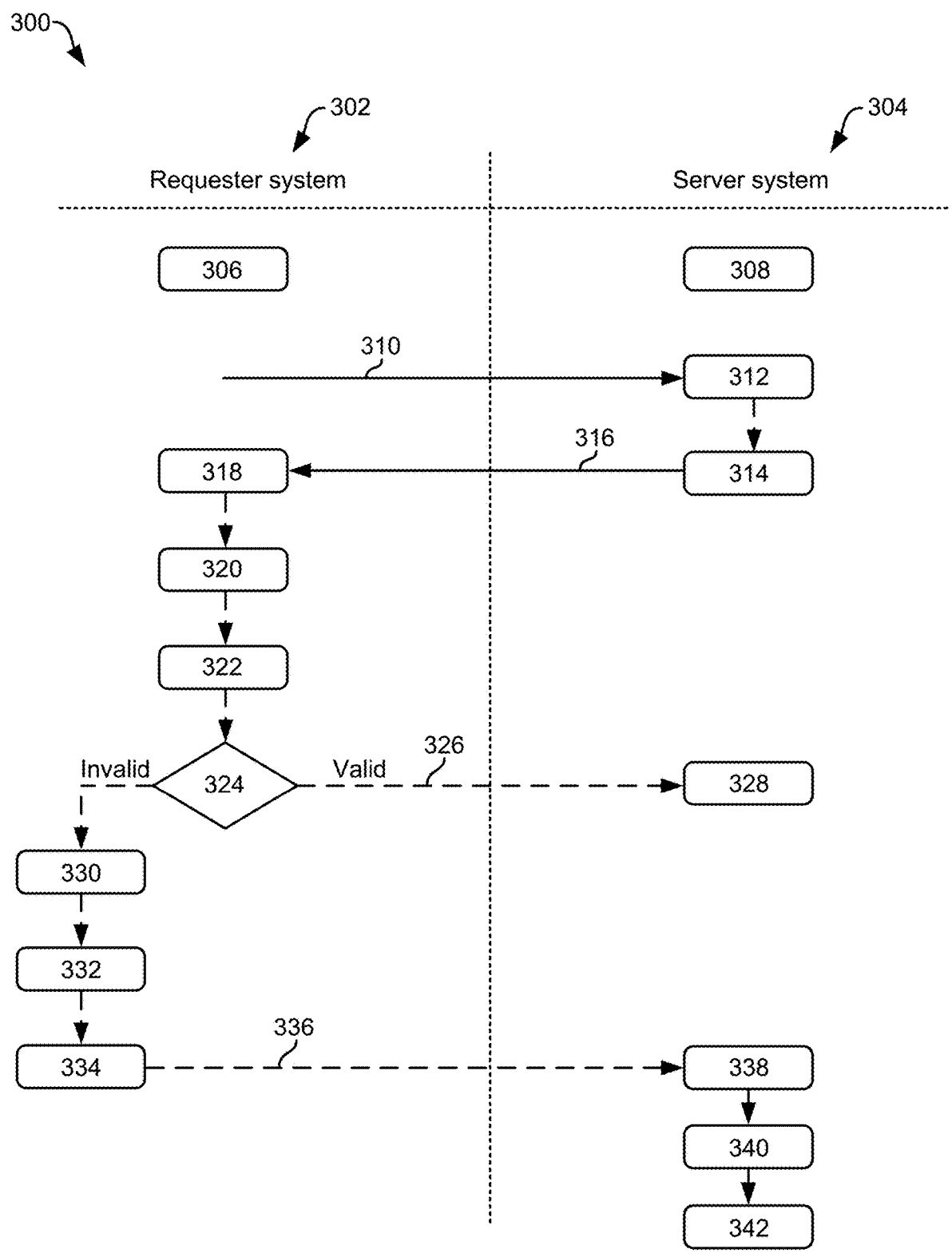
FIG. 3 is a flowchart of a method, in accordance with one embodiment.

Now referring to FIG. 3, a flowchart of a method 300 is shown according to one embodiment. The method 300 may be performed in accordance with the present invention in any of the environments depicted in FIGS. 1-2, 4, 7A-7B, and 10A-10B, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer of interconnected systems, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 includes several operations that may be performed by a requester system 302 and several operations that may be performed by a server system 304. The requester system 302 and the server system 304 may be portions of any known type of interconnected system, and are thus peers. In other words, although the present method 300 is described as being performed between the requester system 302 and the server system 304, in some other approaches, such a method may be performed by any number of peers (requester systems and/or server systems) in an interconnected system. Moreover, according to some approaches, any communication performed between the requester system 302 and the server system 304 may be at least in part based on any one or more known type of transmission protocol(s), e.g., Transmission Control Protocol/Internet Protocol (TCP/IP), HyperText Transfer Protocol (HTTP), etc. Finally, a server system and a requester system as used herein may each be any type of computer system known in the art and capable of communicating with the other system.

As will be described below, communications between the requester system 302 and the server system 304 may in some approaches be utilized for enabling a finer and more targeted scope of logging collection of the server system 304. Such approaches may specifically utilize at least one requester system, e.g., such as requester system 302, for determining whether a scope of server system logging may be updated to, e.g., gather more logging detail to help mitigate errors output by the server system 304, increase performance of the server system 304 by reducing logging detail, increase efficiency of a network that includes the requester system 302 and the server system 304, etc. In doing so, the requester system 302 is now allowed to identify the key and/or the interested element(s) for targeted logging, which can be further used to infer which scope on the server system 304 should be impacted. As a side benefit, in some approaches, processing resources of the server system 304 that otherwise would have been consumed in determining whether a current logging scope of the server system 304 should be updated may be preserved for other uses.

In some approaches, method 300 may optionally include the requester system 302 and/or the server system 304 establishing a respective functional architecture. For example, in one approach, method 300 may optionally include the requester system 302 pre-establishing a functional architecture of the requester system 302, e.g., see operation 306 of method 300. In another approach, method 300 may optionally additionally and/or alternatively include the server system 304 pre-establishing a functional architecture of the server system 304, e.g., see operation 308 of method 300.

Figure 7A:
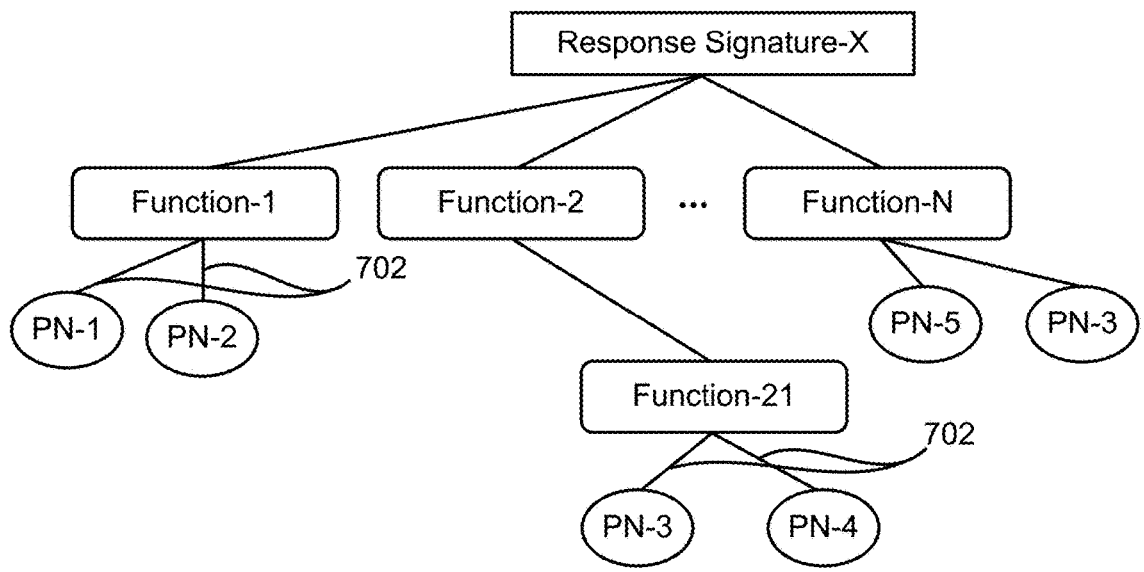
FIG. 7A is a functional topology of a requester system, in accordance with one embodiment.
Figure 7B:
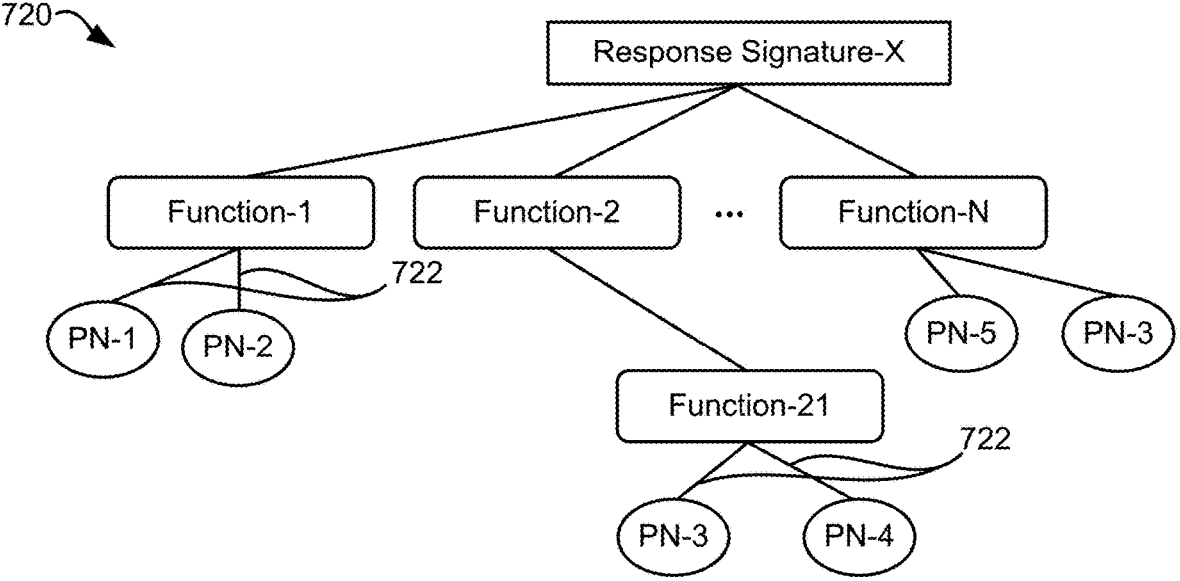
FIG. 7B is a functional topology of a server system, in accordance with one embodiment.

The functional architecture of the requester system 302 and/or the functional architecture of the server system 304 may in some approaches be arranged as a logical tree, e.g., see FIGS. 7A-7B. In such a logical arrangement, the functions of the functional architectures of the systems 302, 304 may be nodes. According to some approaches, the functions of the functional architectures of the systems 302, 304 preferably include at least one associated parameter, e.g., where each parameter and/or value/name of the parameter is logically structured as a leaf of an associated function. A parameter may be metadata that is pre-associated with one or more functions of a functional topology. In some approaches, each parameter and/or value/name of the parameter may be a potential answer to an associated function. In another approach, each parameter and/or value/name of the parameter may be inferred by the server to generate a category of potential results that may occur based on the function being applied, e.g., applied by the requester system 302 and/or being applied by the server system 304.

Within the functional architectures of the systems 302, 304, each parameter may in some approaches be logically connected to an associated function by logical arches. As will be described elsewhere herein, e.g., see FIGS. 7A-7B, in some approaches the functional architecture of the requester system 302 may be relatively similar to the functional architecture of the server system 304, but may also differ in that arches of the functional architecture of the requester system 302 may correspond to consuming functions, e.g., reading that may be performed by the requester system 302, while and arches 722 of the functional topology 720 may correspond to updating functions, e.g., writing that may be performed by the server system 304.

With continued reference to FIG. 3, operation 310 of method 300 includes outputting, from the requester system 302 to the server system 304, a request signature. The request signature may in some approaches be, e.g., stored at one or more locations within a network that includes the requester system 302 and the server system 304, indexed, shared, etc. For example, in one specific approach, the request signature may be output as and/or saved in a text block that concatenates a service endpoint and parameter specified in the request signature in any predetermined order. In another example, the request signature may be stored and indexed in a table, e.g., as will be described in greater detail elsewhere herein. It should be noted that the request signature may be generated by the requester system 302 at any time prior to be output to the server system 304. For example, the request signature may be generated by the requester system 302, e.g., on the fly, at times predetermined by the requester system 302, using a module of the requester system 302 that reads defined data structures of an interface specification of the requester system 302 and the server system 304 and thereby manages request signature(s) output by the requester system 302, etc.

According to some approaches, the request signature may request at least one parameter of a function specified in the request signature. To clarify, a parameter may be defined by a parameter name and/or a value. For example, in the parameter "My_Addresss, A, B, C", "My_Address" is the parameter name, and "A, B, C" is the value. In some approaches, in an interface specification of the requester system 302 and the server system 304, a parameter may be defined by a name, e.g., such as "Address Structure" (or any other description phrase). Moreover, "My_Address" may be the parameter name that is explicitly mentioned and defined literally. Furthermore, the value of the parameter (named/aliased as "Address Structure") may be only defined with a type, e.g., in the present example the type of the value for the parameter name "My_Address" is defined as a string. Accordingly, reference herein to a "parameter", e.g., such as the parameter of the request signature and/or the response signature(s), may in some approaches be a parameter name and/or a value.

Moreover, the specified function preferably exists in the functional topology of the requester system 302 and the functional topology of the server system 304. The specified function may be any known type of function, e.g., a request for a status, a request for information stored in a table, a request for a string of information, etc.

The request signature may additionally and/or alternatively request at least one parameter of a service endpoint specified in the request signature. For example, in one approach, the request signature may request all parameter names and/or values of a set of parameters that are associated with a predetermined function. Moreover, the request signature may specify a service endpoint on the requester system 302 and/or the source system 304 that is to be used thereafter, e.g., by the server system 304 when outputting a response signature to the requester system 302, by the requester system 302 when outputting a response signature to the requester system 302, by the requester system 302 when outputting a subsequent request signature to the requester system 302, etc.

According to a more specific approach, at least some communication, e.g., transactions, procedures, etc., between the requester system 302 and the server system 304 may be defined according to an interface specification of the requester system 302 and the server system 304. Having a pre-established interface specification may allow for the handling of functions on both the requester system 302 and the server system 304. The interface specification may in some approaches be of a type known in art. In some approaches, method 300 may additionally and/or alternatively include defining a known type of message format, e.g., parameter name, parameter type, parameter values, etc. As a result of establishing and/or using a common message format on both the requester system 302 and the server system 304, development thereafter of the requester system 302 and the server system 304 may be performed in parallel by separated development teams.

In some approaches, the request signature may be output to a service endpoint of the server system 304. For example, in one approach, the service endpoint may be a TCP/IP socket port of the server system 304. In such an approach, the request signature may be output by the requester system 302 to the service endpoint, e.g., TCP/IP socket port, of the server system 304 as a serialized data stream.

The request signature may be received by the server system 304, e.g., see operation 312 of method 300. In response to receiving the request signature from the requester system 302, in some approaches a first response signature may be generated by the server system 304, e.g., see operation 314 of method 300. The first response signature preferably includes at least one parameter, e.g., a parameter name of a parameter associated with the function specified in the received request signature or a parameter value of a parameter associated with the function specified in the received request signature, etc. In some approaches, the request signature may be a callable service, e.g., to a service endpoint of the server system 304 with the names of the parameter(s) included in the call. In such an approach the parameter of the first response signature may define an outcome of the callable service.

As will be described elsewhere below, in some approaches, the parameter of the first response signature may, in the functional topology of the server system 304, be incorrectly associated with the function specified in the request signature. According to some specific approaches, the parameter of the first response signature may include an invalid parameter name and/or an invalid value. However, in order to preserve processing resources and/or prevent a decrease in performance of the server system 304, in the present embodiment, a determination of whether the parameter is invalid or is valid is not performed on the server system 304. Rather, according to one approach, the parameter of the generated first response signature may be output to the requester system 302, e.g., see operation 316 of method 300, for performing such a determination.

The first response signature may be received by the requester system 302, e.g., see operation 318 of method 300. According to some approaches, the first response signature may include only the parameter that is associated with the specified function of the request signature. However, in some other approaches, the first response signature may additionally include other information. Reasons for including information in addition to the parameter in the first response signature may depend on the approach, e.g., in order to encrypt the parameter in the first response signature, in order send additional requested data from the server system 304 to the requester system 302, in order to send a batch of parameters for determining the validity of, etc.

Subsequent receiving the first response signature, the requester system 302 may identify within the first response signature at least one parameter that is associated with the specified function, e.g., see operation 320 of method 300. For example, as will be described below, because the first response signature may include information in addition to the parameter, the parameter may be identified from the contents of the first response signature. Several non-limiting examples detailing different contents that the first response signature may include, different forms in which the first response signature may be configured, and techniques for identifying at least one parameter within the first response signature will now be described below according to various approaches.

In some approaches, a parameter that is associated with the specified function may be included in a set of parameters of the first response signature. Depending on the approach, the set of parameters of the first response signature may be configured in any one or more known formats. For example, in some approaches, the set of parameters of the first response signature may be configured as a simple data type, e.g., a string, an integer, a float, a serialized data bit stream, etc. According to some other approaches, the set of parameters of the first response signature may be additionally and/or alternatively configured as a composited data type, e.g., a multi-level set of parameters, a list, a word of a dictionary file, etc.

As mentioned elsewhere above, the request signature may be output to and/or received by a service endpoint of the server system 304. According to some further nonlimiting examples, it may be assumed that the service endpoint of the server system 304 is a HTTP Uniform Resource Locator (URL). Moreover, it may be assumed that the first response signature includes a set of parameters. In such approaches, the parameters of the first response signature may include any one or more formats. For example, in one approach, the first response signature may include one or more parameters embedded in a URL string, e.g., such as value(s) and/or parameter names of the parameter embedded in the string. In such an approach, the URL may be further constituted by, e.g., a hostname of the server system 304, a port number of the server system 304, a relative path established between the requester system 302 and the server system 304, etc. In another approach, the first response signature may include one or more parameters defined in HTTP headers. According to yet another approach, the first response signature may include one or more parameters encoded within a predefined parameter format for HTTP body, e.g., parameters encoded within data that immediately follows HTTP headers in the first response signature.

The first response signature may be additionally and/or alternatively configured in any type of form. For example, in some approaches, the first response signature may be configured as a table and/or a concentrated text block. Accordingly, in some approaches, the first response signature may include data organized in a structure, e.g., data organized as entries in a table, data organized as entries in a list, data organized as a group of parameters, etc. In such approaches, the requester system 302 may identify the parameter within the first response signature by parsing the structured data, e.g., using known parsing and/or identification techniques. In one specific approach, the structured data may be parsed for identifying a parameter that is associated with the function specified in the request signature. In another approach, the structured data may be additionally and/or alternatively parsed for identifying a parameter that is associated with or one or more functions that exist in a same logical path of the functional topology of the requester system as a logical path of the functional topology of the requester system that the function specified in the request signature exists in, e.g., see sub-function Function-21 of FIG. 7A which exists in a same logical path of functional topology 700 as Function-2.

With continued reference to method 300, in another approach, the first response signature may additionally and/or alternatively include subsidiary data that is affiliated with the first response signature. In yet another approach, the first response signature may be encoded, e.g., include encoded data. For example, the contents of the first response signature may be encoded using a known, e.g., method message body, etc., where the data of the encoded contents of the response may be configured in any known form, e.g., Comma-Separated Values (CSV), Hypertext Markup Language (HTML), Extensible Markup Language (XML), a .yml file, JavaScript Object Notation (JSON), etc. In response to the received first response signature being encoded, in some approaches, identifying at least one parameter that is associated with the specified function may include decoding the first response signature, e.g., using known decoding techniques.

Subsequent identifying the parameter of the first response signature, the specified function may be applied to the identified parameter, e.g., see operation 322 of method 300. In one preferred approach, the specified function may be applied to the identified parameter for determining whether the parameter is valid, e.g., see decision 324 of method 300. The specified function may be applied to the identified parameter using any one or more known techniques for causing a parameter to be consumed by a function. For example, according to one approach, applying the specified function to the parameter may include comparing a value and/or name of the parameter to one or more parameter names and/or values that are pre-associated with/potential answers of the function specified in the request signature. In such an approach, in response to the parameter matching one of the parameters that are pre-associated with/potential answers of the function specified in the request signature, the parameter may be determined to be valid. However, in response to the identified parameter not matching any parameters of the function specified in the request signature, the parameter may be determined to be invalid. As will be described elsewhere below, in some approaches, the matching of parameters may be determined with respect to parameter name(s) and/or parameter value(s) of the identified parameter.

Reference will now be made to the previously introduced example that includes the received parameter "My_Addresss, A, B, C." In one approach, an example of the parameter name of the parameter "My_Addresss, A, B, C" being invalid may include My_Address being defined as the parameter name of a parameter(Address Structure), but the response signature of the server system 304 may return "My_Addr," which may result in a returned parameter name "UNDEFINED." The parameter name "UNDEFINED" would be deemed an invalid parameter. In one approach, detection of such an invalid parameter name may be detected by the requester system 302 upon the requester system 302 attempting to decode the response signature returned from the server system 304. For example, in one approach, the parameter may be determined by the requester system 302 to be invalid upon an error and/or error message arising upon reading the undefined parameter "My_Addr." In another approach, the parameter may be additionally and/or alternatively determined by the requester system 302 to be invalid upon the requester system 302 determining that a mandatory parameter is missing from the identified parameter, e.g., the parameter name "My_Address" is not included in the identified parameter.

In some other approaches an invalidity of a value of the identified parameter and thereby an invalidity of the identified parameter may be determined on an interface specification level. According to one more specific approach, the identified parameter may be determined by the requester system 302 to be invalid upon the requester system 302 determining that the identified parameter includes a type error. For example, in one approach, the type error may be based on a characteristic of the interface specification, e.g., a type of the "Address Structure" is a string but the received parameter type is an integer and/or anything besides the expected string. According to another example, in one approach, the error may be a boundary error, e.g., a defined range of a parameter of the interface specification is 1-9 but the value of the identified parameter is 0 or 10.

In yet further approaches an invalidity of the value of the identified parameter and thereby an invalidity of the identified parameter may be determined on a detailed logical level, which may not be detectable on interface specification level. For example, the value "A, B, C" included in the aforementioned identified parameter "My_Address, A, B, C", may be a string type, but the address denoted by the string may be determined by the requester system 302 to not exist.

According to one illustrative approach, detecting/determining the invalidity of an identified parameter name may be performed by auditing a received response signature with a definition of the interface specification for the above mentioned "undefined" and interface specification level types of invalidity. According to another illustrative approach, detecting/determining the invalidity of an identified parameter name may include the requester system 302 detecting occurrence of a runtime error as a result of the invalidity occurring on logical level, which may be detected with a related parameter that is marked as invalid.

In another example, applying the specified function to the parameter may include determining whether a context of the identified parameter of the first response signature matches a context of the function specified in the request signature. Contexts of parameters and response signatures may be any subject or type of description. For example, in one approach an identified parameter may be a specific color, e.g., blue, red, yellow, etc. Accordingly, the context of the parameter may be a color. The function specified in the request signature may request that the server system return the name of a color. In such an example, the function specified in the request signature also has the context of color. In the current example, in response to determining that a context of the identified parameter is a color where the function specified in the request signature requests a color, it may be determined the context of the identified parameter and the context of the function specified in the request signature match. In response to the context of the identified parameter matching a context of the function specified in the request signature, the parameter may be determined to be valid. However, in response to determining that the contexts of the identified parameter and the function specified in the request signature do not match, the parameter may be determined to be invalid. For example, in one approach, a context of the function specified in the request signature may be a color, e.g., such as where the function specified in the request signature requests the color of a bus on a predetermined city route. In response to a determination that the parameter of the first response signature specifies a time that a bus is scheduled to arrive at a given bus stop, the requester system may determine that a context of the first response signature (time) does not match the context of the function specified in the request signature (color). Accordingly, in such an approach, the parameter may be determined to be invalid.

In some approaches, determination of whether or not a context of an identified parameter matches a context of the function specified in the request signature may include the requester system performing comparisons. For example, in one approach, a context of an identified parameter may be compared with a predefined list of potential contexts that is stored in the functional topology of the requester system, e.g., stored as potential contexts of the function specified in the request signature. Moreover, in some approaches, the requester system may identify the context of the identified parameter from the first response signature using similar techniques to those described herein for identifying a parameter(s) in a response signature, e.g., parsing, decoding, decrypting, etc.

Method 300 may optionally include the requester system 302 generating a notification of any determination that the parameter of the first response signature is valid. The generated notification may be output to the server system 304, e.g., see operation 326 of method 300. The notification may be received by the server system 304, e.g., see operation 328, and may be stored to record the valid parameter. In response to receiving notice that the parameter is valid, the server system 304 may not update logging behavior of the server system 304. As will be described elsewhere herein, as a result of the requester system 302 performing the determination as to whether the parameters of the server system 304 are valid, processing resources of the server system 304 may be preserved, e.g., resources of the requester system 302 are recruited for making the determination. In other words, the performance of the server system 304 is not reduced as might otherwise occur if the server system 304 had performed such a validity determination locally. Moreover, as a result of such determinations being performed on by the requester system 302, the server system will understand how to correct invalid data. Such determinations may also be used by the server system 304 in order to understand when to update logging behavior, e.g., increase log verbosity, to facilitate error troubleshooting and when to decrease log verbosity to alleviate performance impact due to incurred resource overhead from increasing system logging.

According to one alternative approach, in response to a determination that the parameter of the first response signature is valid, the requester system 302 may not notify the server system 304 of the determined validity. Accordingly, in such an approach, the server system 304 may determine, e.g., based on not receiving a second response signature from the requester system 302, that the parameter of the first response signature is valid.

In response to a determination that the identified parameter of the first response signature is invalid (as illustrated by the "Invalid" logical path of decision 324) in some approaches a location and/or an identity of the identified parameter determined to be invalid may be marked in a copy of the first response signature, e.g., see operation 330 of method 300. Depending on the approach, such a marking may be performed in order to record the determined invalidity of the parameter stored on the server system 304. As will be described elsewhere below, in some preferred approaches, the server system 304 may be informed that the parameter is invalid, e.g., so that the functional topology/logging behavior of the server system 304 may be updated to include only valid parameters.

In some approaches, in response to a determination that the identified parameter of the first response signature is invalid, method 300 may additionally and/or alternatively include appending information detailing the invalidity, e.g., how such an invalidity was determined, a suggestion for how to correct the invalidity, an error processing log, etc., to the copy of the first response signature. The additional information may in some approaches be used by the server system 304 for amending the invalid parameter, e.g., to be a valid parameter.

Moreover, in some approaches, the requester system 302 may use the functional topology of the requester system 302 to trace and/or map the identified parameter determined to be invalid to a valid parameter, e.g., see operation 332 of method 300. According to one non-limiting example, tracing and/or mapping the identified parameter determined to be invalid to a valid parameter may include performing a known type of tracing and/or auditing of the requester system 302 for determining the parameter of an original copy of the parameter previously returned by the server system 304 to the requester system 302. According to some more specific approaches, tracing and/or mapping the identified parameter determined to be invalid to a valid parameter may include the requester system 302 communicating with another system (not shown) for determining a valid parameter for the function specified in the request signature. In yet another approach, tracing and/or mapping the identified parameter determined to be invalid to a valid parameter may include determining one or more functions of a functional topology of the server system 304 that have and/or do use the invalid parameter. Such a determination may be performed by performing an audit on, e.g., the functional topology of the requester system 302, the functional topology of the server system 304, response signatures previously received from the server system 304, etc.

In some approaches the requester system 302 may generate a second response signature, e.g., see operation 334 of method 300. According to one preferred approach, the second response signature may include the marked-up copy of the first response signature. The second response signature may additionally and/or alternatively include any other information associated with the determining that the parameter is invalid and/or any other information that is scheduled to be sent from the requester system 302 to the server system 304. For example, in one approach, such information may include one or more functions of a functional topology of the server system 304 that is determined by the requester system 302 to use the invalid parameter.

Operation 336 of method 300 includes outputting from the requester system 302 to the server system 304, the second response signature with the included marked-up copy of the first response signature. The second response signature with the included marked-up copy of the first response signature may be output to the server system 304 for updating logging behavior of the server system 304 when the server system 304 thereafter performs the specified function of the interface specification, e.g., as will be described elsewhere herein (see operation 340 of method 300). The second response signature and/or information of the second response signature (such as the marked-up copy of the first response signature) may be configured in any format, e.g., such as those described elsewhere herein for the request signature and/or for the first response signature. According to another approach, the second response signature and the marked-up copy of the first response signature may be output to the server system 304 as a service call.

The second response signature may be received by the server system 304, e.g., see operation 338 of method 300.

The server system 304 may use the received second response signature and/or the marked-up copy of the first response signature for identifying at least one function of the server system 304 that includes the parameter identified in the marked-up copy of the first response signature to be invalid, e.g., see operation 340 of method 300. For example, in some approaches identifying the function(s) of the server system 304 that includes the parameter identified in the marked-up copy of the first response signature to be invalid may include the server system 304 searching the functional topology of the server system 304 for function(s) that have the invalid parameter associated therewith and/or that have manipulated the invalid parameter, e.g., previously output the invalid parameter in another response signature. In some approaches in which the received second response signature and/or the marked-up copy of the first response signature is, e.g., encoded, serialized, encrypted, etc., identifying function(s) of the server system 304 that includes the invalid parameter may include the server system 304 reformatting, e.g., decoding, decrypting, etc., the received second response signature and/or the marked-up copy of the first response signature.

Operation 342 of method 300 includes modifying the logging behavior of the server system 304. Note that a previous verbosity of logging performed by the server system 304 may have resulted in troubleshooting performed on the server system 304 to not correct the invalid parameter. Accordingly, as a result of receiving the second response signature and/or the marked-up copy of the first response signature from the requester system 302, the logging behavior of the server system 304 may be modified in order to provide troubleshooting performed on the server system 304 with an amount of information that results in invalid data within the functional topology of the server system 304 being corrected.

In one approach, modifying the logging behavior of the server system 304 includes generating a function stack calling sequence that includes each of the function(s) identified to have the invalid parameter associated therewith and/or that have manipulated the invalid parameter. The logging behavior of one or more of the functions of the function stack calling sequence may in one approach be adjusted to be a predetermined target logging level, which will now be described below according to various approaches. In some approaches, a current logging behavior of the server system 304 may be set to, e.g., debug (a relatively finest degree of detail logged), informational (a relatively less fine degree of detail logged than debug), warn (a relatively less fine degree of detail logged than informational), or critical (a relatively least degree of detail logged). According to one specific approach, where the server system 304 is running as a relatively high traffic production system, the logging behavior may reside at critical level, e.g., in order to increase performance of the server system 304 by collecting a relatively low logging detail. However, upon the requester system providing information to the server system 304 that indicates that troubleshooting is to be performed on the server system 304, e.g., marked invalid parameter, the logging behavior of one or more of the functions of the function stack calling sequence and/or one or more subfunctions that call the function, may in one approach be adjusted to the predetermined target logging level, e.g., in the present example a logging behavior that logs more detail than the critical level. For example, the logging behavior of the server system 304 may be adjusted from critical to informational or debug. In some approaches, in response to the requester system 302 determining and/or the server system 304 receiving indication from the requester system 302 that a subsequent updating of the logging behavior does not correct invalid parameters from being output by the server system 304, the logging verbosity of the server system 304 may be increased to an even greater verbosity. Such a determination may be made by the requester system 302 while performing method 300 subsequent an updating of the logging behavior of the server system 304, e.g., based on the previous updating of the logging behavior being recorded on the server system 304.

Modifying the logging behavior of the server system 304 may in some approaches at least in part additionally and/or alternatively depend on performance metrics of the server system 304. According to some approaches, an increasing of the verbosity of the logging behavior of the server system 304 may additionally and/or alternatively incorporate runtime server system load into consideration. For example, at least in part in response to a determination that a CPU usage of the server system 304 is below 50%, and a memory usage of the server system 304 is below 80%, the target logging level may be updated to debug. However, in another example, at least in part in response to a determination that the CPU usage of the server system 304 is between 90% and 50%, and the memory usage of the server system 304 is between 90% and 80%, the target logging level may be updated to informational.

Such an adjustment may in some approaches include enabling logging, e.g., in other words logging may be disabled prior to the adjustment. In another approach, such an adjustment may include disabling logging. According to another approach, the logging level of one or more of the functions of the function stack calling sequence may be adjusted to be a predetermined default logging level. Various examples of modifying the logging behavior of a server system will be described in greater detail elsewhere herein, e.g., see FIGS. 11A-11B.

Adjustment of the logging behavior of functions of the server system 304 will ensure proper logging of error(s) on the server system 304 that previously resulted in and/or would have resulted in incorrect/invalid data being output by the server system 304 in a response signature, e.g., such as the first response signature. As a result, response signatures thereafter output by the server system 304 will include valid data. However, it should be noted that such a correction of logging behavior on the server system 304 is preferably not achieved as a result of increasing processing of the server system 304. Instead, identifying of invalid parameters is performed by the requester system 302, and as a result processing resources of the server system 304 is preserved.

Figure 4:
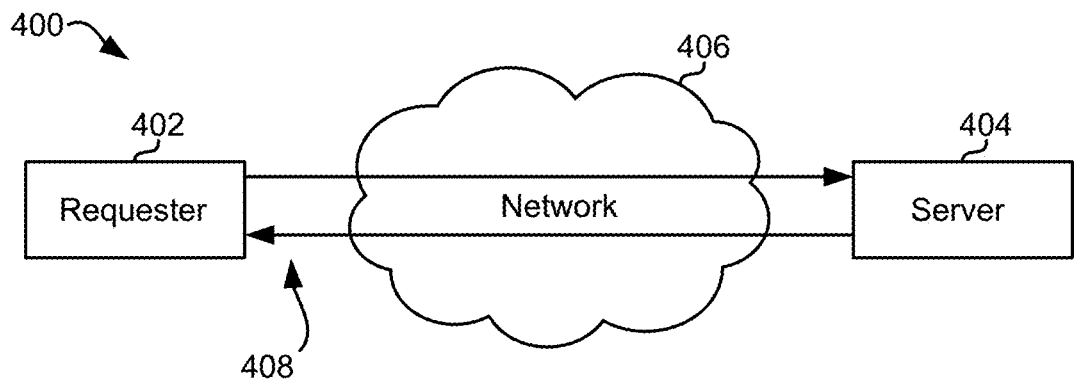
FIG. 4 is an architecture of interconnected systems, in accordance with one embodiment.

FIG. 4 depicts an architecture 400 of interconnected systems, in accordance with one embodiment. As an option, the present architecture 400 may be implemented in conjunction with features from any other embodiment listed herein, such as those described with reference to the other FIGS. Of course, however, such architecture 400 and others presented herein may be used in various applications and/or in permutations which may or may not be specifically described in the illustrative embodiments listed herein. Further, the architecture 400 presented herein may be used in any desired environment.

Architecture 400 includes a requester system, e.g., requester system 402, and a server system 404. The requester system 402 (client) and the server system 404 are interconnected systems of a common network 406. Although only two systems are shown to be in communication in the network 406, e.g., see requester system 402 to server system 404 and server system 404 to requester system 402 communication 408, depending on the approach, the network 406 may include any number of interconnected systems. The requester system 402 and/or the server system 404 may be any known type(s) of systems, and moreover may each include a process unit, e.g., a CPU, memory, storage, a network interface to enable loading of software and thereby enabling the running of predefined procedures, etc.

Figure 5A:
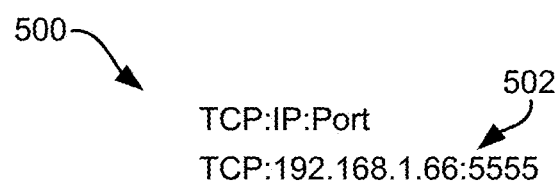
FIG. 5A is a representation of a service endpoint, in accordance with one embodiment.
Figure 5B:
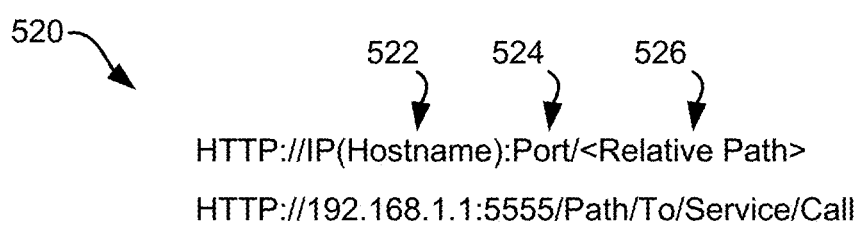
FIG. 5B is a representation of a service endpoint, in accordance with one embodiment.

Communication 408 between the requester system 402 and the server system 404 may be based on any one or more transmission protocols, e.g., TCP/IP, HTTP, etc., e.g., see FIGS. 5A-5B. Moreover, one or more transactions between the requester system and server system may be defined according to a predefined interface specification, which may be configured for handling operations that occur on the requester system 402 and/or the server system 404. The interface specification may be of a known type, and may be used for defining operations/processes that occur between interconnected nodes of the architecture 400, e.g., the requester system 402 and the server system 404.

FIGS. 5A-5B depict service endpoints 500, 520 of interconnected systems, in accordance with one embodiment. As an option, the present service endpoints 500, 520 may be implemented in conjunction with features from any other embodiment listed herein, such as those described with reference to the other FIGS. Of course, however, such service endpoints 500, 520 and others presented herein may be used in various applications and/or in permutations which may or may not be specifically described in the illustrative embodiments listed herein. Further, the service endpoints 500, 520 presented herein may be used in any desired environment.

Referring first to FIG. 5A, service endpoint 500 is a TCP/IP based service endpoint that in some approaches may be used for communication between interconnected systems. The service endpoint 500 includes a specified TCP/IP port number 502. In contrast, service endpoint 520 is an HTTP based service endpoint that according to some approaches may be used for communication between interconnected systems. The service endpoint 520 specifies a hostname 522, a port number 524, and a relative path 526 to the port number 524.

Figure 6:
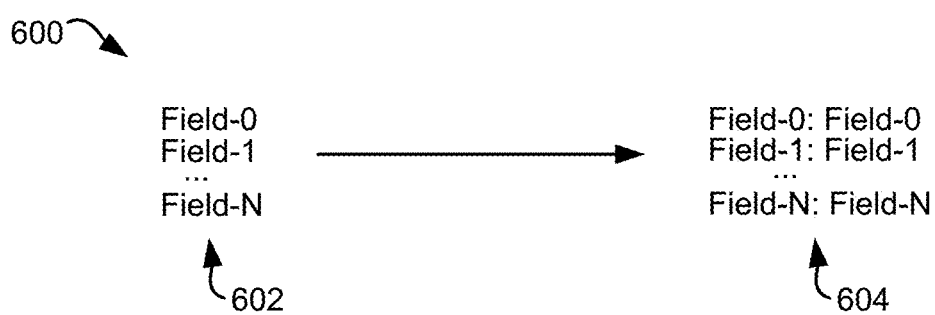
FIG. 6 is a representation of formats used in an interface specification, in accordance with one embodiment.

Representation 600 of FIG. 6 depicts data formats 602, 604 used in an interface specification of interconnected systems, in accordance with one embodiment. As an option, the present data formats 602, 604 may be implemented in conjunction with features from any other embodiment listed herein, such as those described with reference to the other FIGS. Of course, however, such data formats 602, 604 and others presented herein may be used in various applications and/or in permutations which may or may not be specifically described in the illustrative embodiments listed herein. Further, the data formats 602, 604 presented herein may be used in any desired environment.

In some approaches, a named data format, e.g., such as data format 604, may be used for defining content, e.g., such as a parameter (data entry), of a request signature and/or a response signature. In such approaches, the data format may be readily useable, e.g., not be subject to decoding, by the system receiving the request signature or response signature.

According to some other approaches, an anonymous data format, e.g., such as data format 602, may be additionally and/or alternatively used for defining content of a request signature and/or a response signature. In some approaches, communication using an anonymous data format may include communicating using only values exchanged between a requester system and a server system. In at least some of such approaches, at least one component of the requester system and/or the source system may be used for converting received anonymous data entries into named data entries, e.g., where the names of the named data entries are defined in and thereby converted using an interface specification known to the requester system and a server system.

FIGS. 7A-7B depict functional topologies 700, 720, in accordance with one embodiment. As an option, the present functional topologies 700, 720 may be implemented in conjunction with features from any other embodiment listed herein, such as those described with reference to the other FIGS. Of course, however, such functional topologies 700, 720 and others presented herein may be used in various applications and/or in permutations which may or may not be specifically described in the illustrative embodiments listed herein. Further, the functional topologies 700, 720 presented herein may be used in any desired environment.

As previously described elsewhere herein, a request signature output from a requester system to a server system may request at least one parameter of a function specified in the request signature. In preferred approaches, the specified function may exist in a functional topology of the requester system and a functional topology of the server system. For example, referring first to FIG. 7A, the functional topology 700 is a functional topology of a requester system. In some approaches the functional topology 700 may be generated by the requester system. With reference to FIG. 7B, the functional topology 720 is a functional topology of a server system. The functional topology 720 may be generated by the server system.

The functional topologies 700, 720 may include any number of functions, e.g., see Function-1, Function-2, Function-21, . . . , Function-N. Each of the functions may have at least one significant data entry associated therewith, e.g., parameter in the current approach. Each parameter may specify a predetermined name and/or type of data in accordance with the interface specification. For example, parameters PN-1, PN-2 are each associated with Function-1 of the functional topology 700 and with Function-1 of the functional topology 720. In some approaches, a function may include a sub-function, e.g., see sub-function Function-21 of Function-2. In another approach, Function-2 may be considered a root node, and Function-21 may be considered a child node based on Function-21 stemming from Function-2.

In FIGS. 7A-7B, the functions are arranged as nodes of the functional topologies 700, 720, and the parameters are arranged as leaf of an associated function. In some approaches, each parameter may be a potential answer to an associated function. In another approach, each parameter may be a category of potential results that may occur based on an associated function being applied to the parameter.

Each parameter of a functional topology may be logically connected to an associated function by logical arches. For example, in FIG. 7A, logical arches 702 logically connecting parameter names, e.g., see PN-1-PN-5, to an associated function, e.g., see Function-1-Function-N, of the functional topology 700. Moreover, in FIG. 7B, logical arches 722 logically connect parameter names PN-1-PN-5 to an associated function, e.g., see Function-1-Function-N, of the functional topology 720. In some approaches functional architecture 700 may be relatively similar to functional topology 720, however differ in that arches 702 of the functional architecture 700 may correspond to consuming functions, e.g., reading that may be performed by the requester system, while and arches 722 of the functional topology 720 may correspond to updating functions, e.g., writing that may be performed by the server system.

In one approach, during generating of a functional topology of an interconnected system, a function of a system may at least initially include no parameters associated therewith. In such an approach, in response to the function of the system not including a name associated therewith, a recursive search of subordinate function, e.g., such as a sub-function called in a received request signature, may be performed by the system. In such an example, any one or more parameters of a discovered sub-function may be associated with the function in the functional topology of the system that calls the sub-function. For example, in FIGS. 7A-7B parameter names PN-3 and PN-4 may be associated with a sub-function Function-21 and Function-2.

Figure 8:
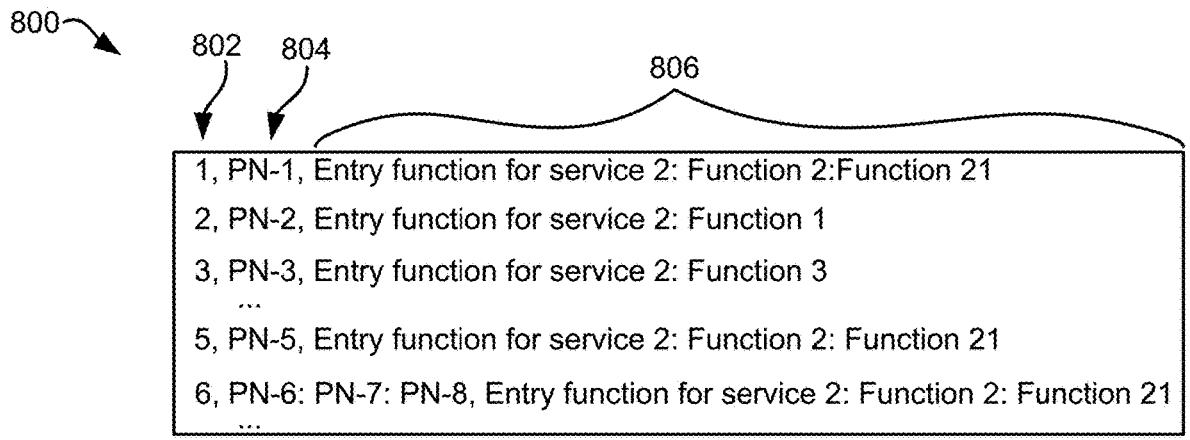
FIG. 8 is a table in which associations between parameters and function stack calling sequences are recorded, in accordance with one embodiment.

FIG. 8 depicts a table 800 that includes a mapping between parameters and associated functions, in accordance with one embodiment. As an option, the present table 800 may be implemented in conjunction with features from any other embodiment listed herein, such as those described with reference to the other FIGS. Of course, however, such table 800 and others presented herein may be used in various applications and/or in permutations which may or may not be specifically described in the illustrative embodiments listed herein. Further, the table 800 presented herein may be used in any desired environment.

In some approaches, generating a functional topology of system may include generating a table 800 in which an association between each parameter name 804 and an associated function stack calling sequence 806 is recorded. More specifically, in one approach, each parameter name 804 may be associated with a function stack calling sequence 806 that has previously been utilized to update the parameter. In table 800 each parameter name 804 and function stack calling sequence 806 association may be identified by an association ID 802.

One or more parameters may in some approaches name other parameters and/or share a common function stack calling sequence 806. For example, including multiple parameter names, i.e. PN-6: PN-7: PN-8, in the entry having the association ID PN-6 may denote that parameter name PN-8 is named in parameter name PN-7 which is named in parameter name PN-6. This inclusion of multiple parameter names 804 in an entry of table 800 may also denote that each of the parameter names PN-6-PN-8 share the function stack calling sequence Entry function for service 2: Function 2: Function 21.

Figure 9A:
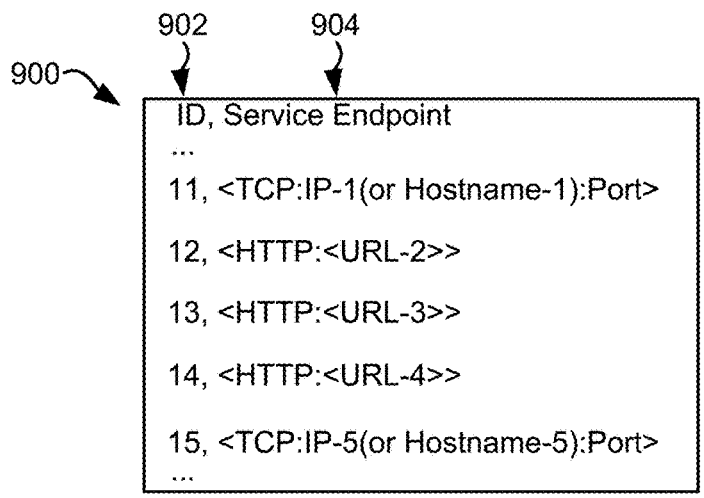
FIG. 9A is a table that includes service endpoint IDs and service endpoints, in accordance with one embodiment.
Figure 9B:
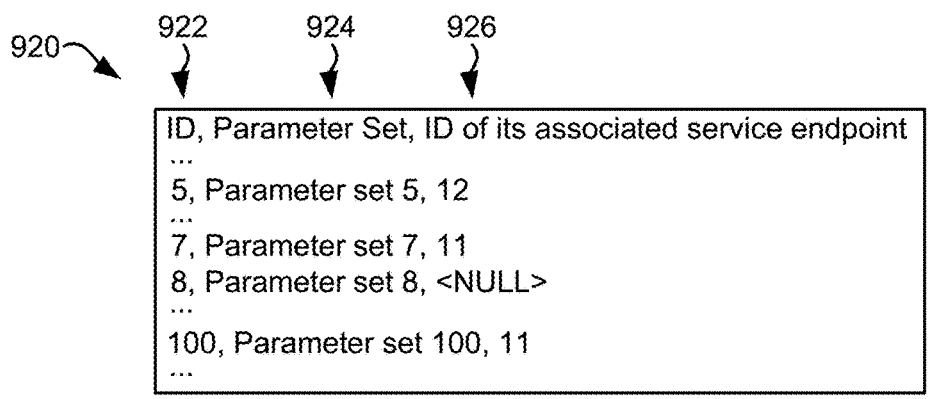
FIG. 9B is a table that includes parameter set IDs, parameter sets, and service endpoints associated with the parameter sets, in accordance with one embodiment.
Figure 9C:
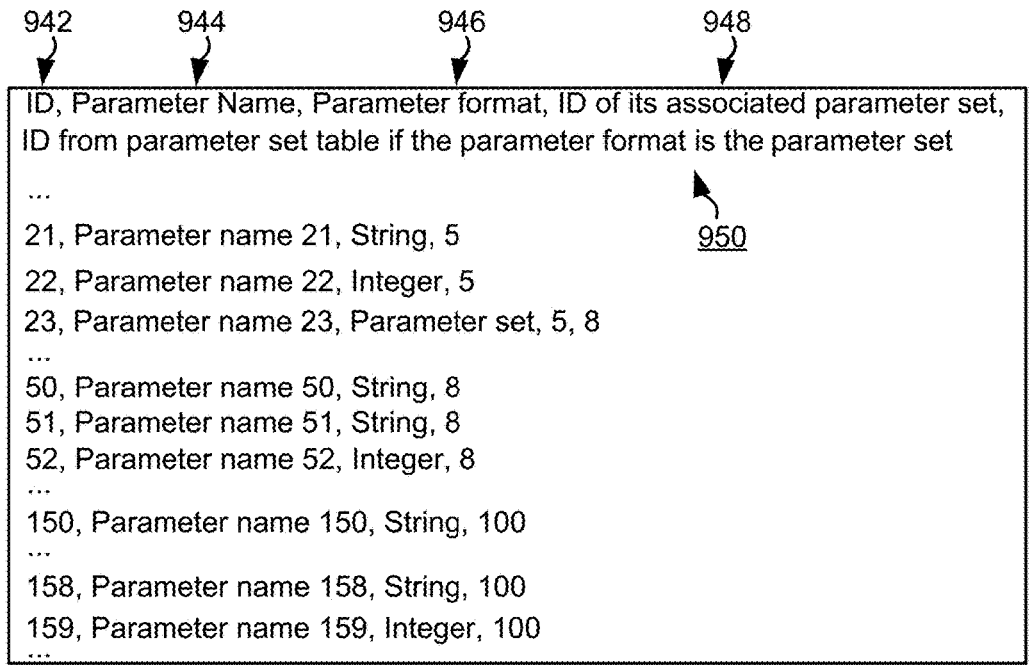
FIG. 9C is a table that includes parameter IDs, parameter names, and parameter formats, in accordance with one embodiment.

FIGS. 9A-9C depict tables 900, 920, 940, in accordance with several embodiments. As an option, the present tables 900, 920, 940 may be implemented in conjunction with features from any other embodiment listed herein, such as those described with reference to the other FIGS. Of course, however, such tables 900, 920, 940 and others presented herein may be used in various applications and/or in permutations which may or may not be specifically described in the illustrative embodiments listed herein. Further, the tables 900, 920, 940 presented herein may be used in any desired environment.

It should be prefaced that the commas of the tables 900, 920, 940 may separate different data types in each entry of the tables 900, 920, 940.

Referring first to FIG. 9A, table 900 includes service endpoint IDs 902 and associated service endpoints 904, e.g., indexed in the table 900. Moreover, the table 900 includes specified service endpoint protocols, e.g., see TCP and HTTP of the service endpoints 904. The table 900 may be used for organizing the service endpoint IDs 902 and service endpoints 904, which may be stored at any one or more known databases, e.g., a database of a requester system, a database of a server system, within a database of a network that includes the requester system and the server system, etc. Depending on the approach, the table 900 may be referenced and used for any reason, e.g., generating a request signature, comparing against a parameter identified within a received response signature, generating a response signature, included in a request signature, included in a response signature, etc. Moreover, although the table 900 includes a plurality of indexed service endpoint IDs 902 and associated service endpoints 904, in other approaches, each respective service endpoint ID 902 and associated service endpoint 904 may be indexed and stored in a separate table.

In some approaches, parameter sets may be stored and indexed in a table by at least one of the servers. For example, table 920 of FIG. 9B includes parameter set IDs 922, parameter sets 924, and IDs 926 of service endpoints that are each associated with a different one of the parameter sets 924. Depending on the approach, the table 920 may be referenced and used for any reason, e.g., generating a request signature, comparing against a parameter identified within a received response signature, generating a response signature, included in a request signature, included in a response signature, etc.

In some other approaches, tables may include storing and indexing each parameter, e.g. as opposed to indexing and storing according to parameter sets. For example, referring now to FIG. 9C, table 940 includes parameter IDs 942, parameter names 944, parameter formats 946, IDs 948 of parameter sets that are each associated with a different one of the parameter names 944, and IDs 950 from a parameter set table if the parameter format is the parameter set.

With continued reference to FIG. 9C, the table 940, preferably does not include looping. For example, for a given entry in the table 940, data of column four, e.g., see IDs 948, preferably does not match data of column five, e.g., see IDs 950. Moreover, in some approaches, the data of column five of a given entry in the table 940 may be set to "NULL" in response to a determination that the data entry is a simple data type, e.g., a string, an integer, a float, a serialized data bit stream, etc.

When storing and indexing a parameter set in the at least some approaches that utilize database storage, indexing may be iteratively applied to all parameter names that are determined to be composited (if any) in order to establish simple data types. This is because parameter names of simple data types may be more efficient for, e.g., indexing, identifying, decoding, etc., than composited data types. In such approaches, a request signature may be translated/mapped to a data structure including IDs that correspond to the data structure of metadata of the request. An encoded request signature that is generated utilizing table 900 of FIG. 9A is presented below for purposes of a non-limiting example:

12(5(21, 22, 23(50, 51, 52 . . . ), . . . )) Request Signature (1)

For reference, the 12 of the above Request signature (1) corresponds to service endpoint ID 12 of the table 900 of FIG. 9A. Accordingly, the request signature is to be sent to service endpoint <HTTP:<URL-2>> with parameter set 5. As shown in Request signature (1), parameter set 5 includes a parameter name 21, which as shown in table 940 of FIG. 9C is a string parameter format. Moreover, parameter set 5 includes a parameter named 22, which as shown in table 940 of FIG. 9C is an integer parameter format. The parameter set 5 also includes a parameter named 23, which as shown in table 940 of FIG. 9C is a parameter set parameter format, e.g., parameter set 8. The Request signature (1) also includes parameter name 50, parameter name 51 and parameter name 52.

It should be noted that in some approaches, the numbers (IDs) in Request signature (1) may be used to encode the request signature. Accordingly, in some approaches, information of the Request signature (1) may be sorted, e.g., by a server system that receives the request signature, for correlating the encoded numbers to associated data of a functional topology of the server system.

In continuance of the above example, in some approaches, subsequent receiving the Request signature (1) the server system may access the tables 900, 920, 940, provided that the tables are shared with the server system. Based on accessing the tables 900, 920, 940, according to one approach a request signature generator of the server system may generate a first response signature for outputting to the requester system, e.g., see an example of such a first response signature presented below:

11(100(150, 158, 159, . . . )) Response Signature (1)

The above Response Signature (1) specifies that the first response signature is output to the requester system from the Service Endpoint—<TCP:IP-1(or Hostname-1):Port>, with a returned parameter set named parameter set 100. The parameter set 100 specifically includes at least the three identified parameter names, e.g., parameter name 150, parameter name 158, and parameter name 159. In some approaches, the response signature may be output by the server system as subsidiary data affiliated with the Response Signature (1).

Subsequent receiving the first response signature, the requester system may identify within the first response signature at least one parameter. For example, in one approach, the requester system may include a module or component for parsing the received response signature. As previously mentioned, in some approaches, a format of the response signature is preferably defined according to interface specifications of the requester system and the server system. In some approaches where the received response signature is encoded, the requester system may decode the response signature, e.g., parsing data of the response signature if the data is organized in a structure, extracting one or more parameters of the response signature, etc.

In some approaches, the first response signature may be compared with a response signature generated by the requester system according to an interface specification of the server system and requester system, for determining whether the whether the identified parameter is valid.

In some more specific approaches, the function specified in the request signature and/or any other function of a functional topology of the requester system may be applied to the identified parameter for determining whether the identified parameter is valid. In such approaches, the function specified in the request signature may in one approach, validate the parameter, which may then be subject to further processing, e.g., such as an applying of additional functions to the parameter. Depending on the approach, the further processing may result in the identified parameter being determined to be valid, or in one approach an error code may be generated and returned to called function that identifies the parameter as being invalid. In another approach the function specified in the request signature may identify the parameter as being invalid.

In response to a determination that the identified parameter of the first response signature is invalid, in one approach, a location and/or an identity of the identified parameter determined to be invalid may be marked in a copy of the first response signature. The marked-up copy of the first response signature may be included in a response signature generated by the requester system, e.g., herein referred to as a second response signature. In some approaches, the marking process may include appending additional information to the identified parameter.

Figure 10A:
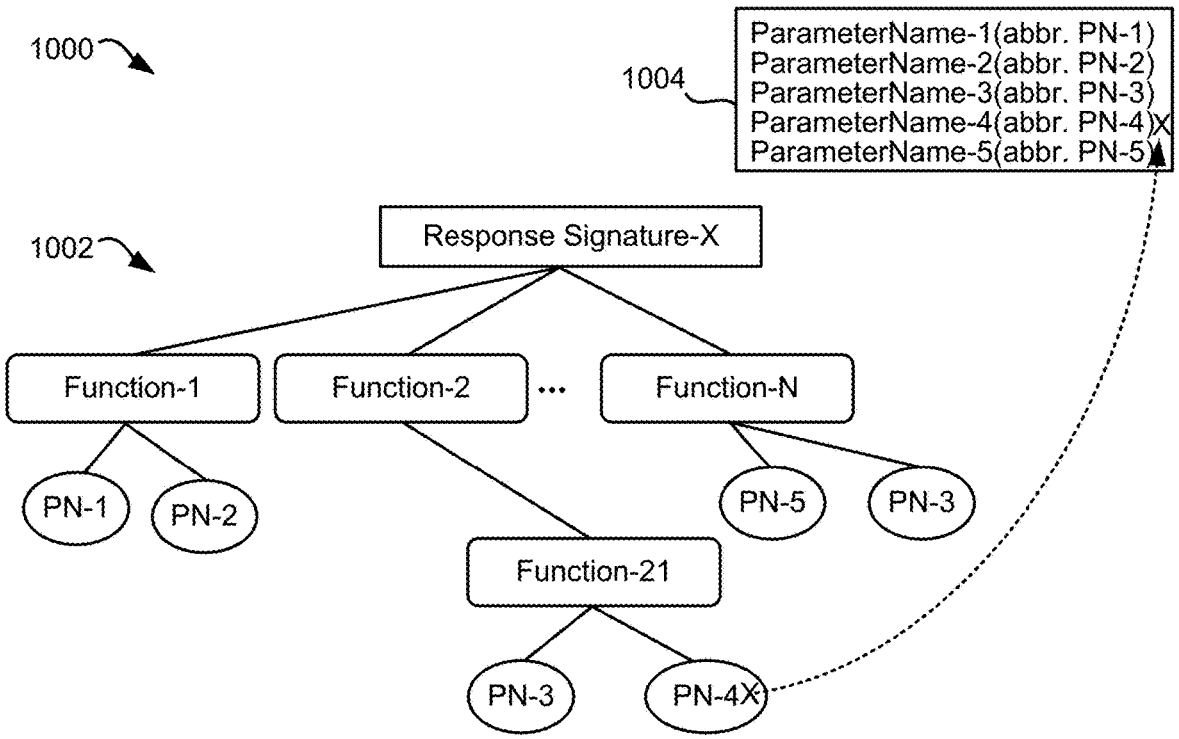
FIG. 10A is a representation of a functional topology of a requester system and a response signature generated by the requester system, in accordance with one embodiment.

FIG. 10A depicts a representation 1000 of a functional topology of a requester system and a response signature generated by the requester system, in accordance with one embodiment. As an option, the present representation 1000 may be implemented in conjunction with features from any other embodiment listed herein, such as those described with reference to the other FIGS. Of course, however, such representation 1000 and others presented herein may be used in various applications and/or in permutations which may or may not be specifically described in the illustrative embodiments listed herein. Further, the representation 1000 presented herein may be used in any desired environment.

Representation 1000 includes a functional topology 1002 of a requester system. In the present approach, a parameter name, e.g., PN-4, of a response signature received by the requester system is determined by the requester system to be invalid. According to one approach in response to determining that the parameter name PN-4 is invalid, the requester system may mark, e.g., flag, notate the invalidity using a known type of logical marker, etc., the parameter name as being invalid in the functional topology 1002, e.g., see X in PN-4. Representation 1000 also includes a second response signature 1004 generated by the requester system. In one approach, the second response signature 1004 includes a copy of the response signature received from a server system. The requester system may use the functional topology of the requester system to trace and/or map the identified parameter name determined to be invalid to a valid parameter name. For example, in some approaches, functions of the functional topology of the requester system may be used for performing a known type of tracing and/or mapping back of data elements of the invalid parameter names, e.g., global variables, local variables, etc., to an original data copy returned from server system.

Depending on the approach, any parameter names that are determined from the tracing/mapping may be included in the second response signature 1004. The second response signature 1004 may be output from the requester system to the server system. The server system may receive the second response signature 1004, e.g., see FIG. 10B, and use the second response signature 1004 for updating logging behavior of the server system when the server system thereafter performs the specified function, e.g., see FIGS. 11A-11B.

The second response signature 1004 is preferably output to the server system in a data structure commonly understood by the requester system and the server system. For example, in one approach, the second response signature 1004 may be output to the server system in a 501-message format. In another approach, the second response signature 1004 may be output to the server system in a structured format based on a database, e.g., see Response Signature (2) below.

11(100(150, 158X, 159, . . . )) Response Signature (2)

In the second response signature, e.g., Response Signature (2) the parameter name 158 of parameter set 100 is marked, e.g., see X, to indicate the determined invalidity of the parameter name. Moreover, Response Signature (2) specifies that the invalid parameter name 158 was discovered by the requester system in the response signature returned from service endpoint 11 of the server system, e.g., more specifically service endpoint 11(<TCP:IP(or Hostname):Port>). In some approaches, multiple data entries that are determined by the requester system to be invalid may be marked in the second response signature.

Figure 10B:
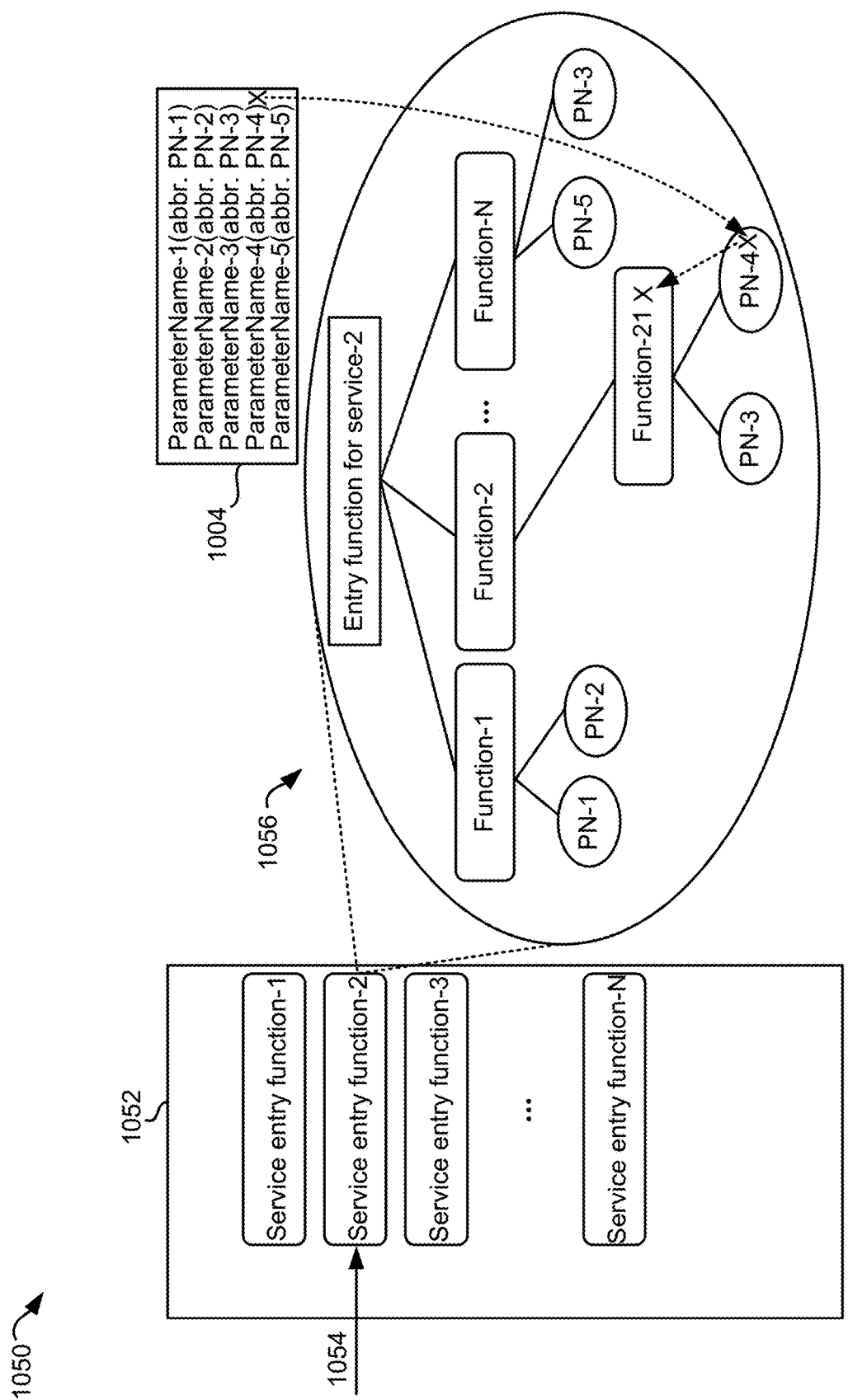
FIG. 10B is a representation of a functional topology of a server system and the response signature generated by the requester system of FIG. 10A, in accordance with one embodiment.

FIG. 10B depicts a representation 1050 of a functional topology of a server system and the second response signature generated by the requester system of FIG. 10A, in accordance with one embodiment. As an option, the present representation 1050 may be implemented in conjunction with features from any other embodiment listed herein, such as those described with reference to the other FIGS. Of course, however, such representation 1050 and others presented herein may be used in various applications and/or in permutations which may or may not be specifically described in the illustrative embodiments listed herein. Further, the representation 1050 presented herein may be used in any desired environment.

A server system of FIG. 10B may receive the second response signature 1004 sent by the requester system of FIG. 10A for updating logging behavior of the server system. In one approach, the second response signature 1004 may be output by the requester system via a service call to a common service endpoint 1052 of the server system, or in an alternate approach, via several service endpoints 1052 of the server system.

The second response signature 1004 may be received and/or logged as a logging behavior update request (LBUR). In order to correct the invalid parameter names/fulfill the LBUR, the server system may identify within the second response signature 1004 at least one invalid parameter name. In some approaches, the identifying may include decoding the second response signature 1004. In another approach, the identifying may include searching for, e.g., marked parameter names, marked values of a parameter, etc.

In some approaches, invalid parameter name(s) identified in the second response signature 1004 may be mapped to functions that utilize the invalid parameter names. In some approaches, mapping invalid parameter names to functions that utilize the invalid parameter names, e.g., in a function stack calling sequence, may include the server system accessing one or more tables that include associations between a given parameter name and one or more functions of the functional topology of the server system. However, in some approaches, the server system of FIG. 10B may not have access to such tables upon receiving the second response signature 1004 from the requester system of FIG. 10A. Accordingly, as will now be described below, in some approaches, the server system may use a functional topology of the server system for identifying functions that utilize the invalid parameter name(s) of the second response signature 1004.

With continued reference to FIG. 10B, in some approaches, the second response signature may include an identifier of a service entry function that may be used in updating logging behavior of the server system. In some approaches, this service entry function may be identified in the previous communications between the requester system and the server system, e.g., in the request signature and the first response signature. For example, a normal business service request signature previously output by the requester system to the server system may have previously specified a data structure http://<IP>:<PORT>/<Service-Entry-Function-x>, where within the HTTP message, request parameters are included. Therefore, together with the service entry function name(<Service-Entry-Function-x>), the data included in the request may be a business service request signature. Thereafter, because the first response signature is affiliated with the request signature, the response body (parameter) will be included and returned to the requester system. Accordingly, the requester system may understand that the parameters of the response signature are received from <Service-Entry-Function-x> of the server system.

Upon receiving the second response signature 1004, beginning from the service endpoint 1052, the server system may search for a service entry function, e.g., see Service entry function-1-Service entry function-N, of the service endpoint 1052 that is associated with the identifier the second response signature. For example, assume that the second response signature received by server system includes 11(100(150, 158X, 159, . . . )). In this example, '11' may be an identifier of a service entry function from the service endpoint 1052 of FIG. 10B, and it may be assumed that "11" identifies the Service entry function-2. Accordingly, the server system may know that the reported invalid parameter is relevant to Service entry function-2.

Upon identifying a service entry function that serves the request type defined in the request signature, e.g., Service entry function-2, the server system may traverse a functional topology 1056 of the server system in order to identify one or more functions of the functional topology 1056 that utilize invalid parameter names identified in the second response signature 1004. Moreover, in some approaches, the server system may generate a function stack calling sequence that includes the function(s) that utilize the invalid parameter names. For example, in representation 1050, such a function stack calling sequence may be represented by: Service entry function-2: Function-2: Function-21. In some other approaches, the server system may have access to a pre-established table that includes one or more parameter names of the functional topology 1056 mapped to one or more predetermined function stack calling sequences. Accordingly, in such an approach, the server system may retrieve a function stack calling sequence of the table that corresponds to the invalid parameter name of the second response signature 1004.

The function stack calling sequence may be used for adjusting the logging level of the server system, e.g., in order to thereafter mitigate called functions of the server system from returning invalid parameter names. In some preferred approaches, the logging level of a function of the function stack calling sequence that resides at a most extended position, e.g., a deepest sub-function of a logical path of a functional topology, of the functional topology of the server system, e.g., Function-21, may be updated.

Figure 11A:
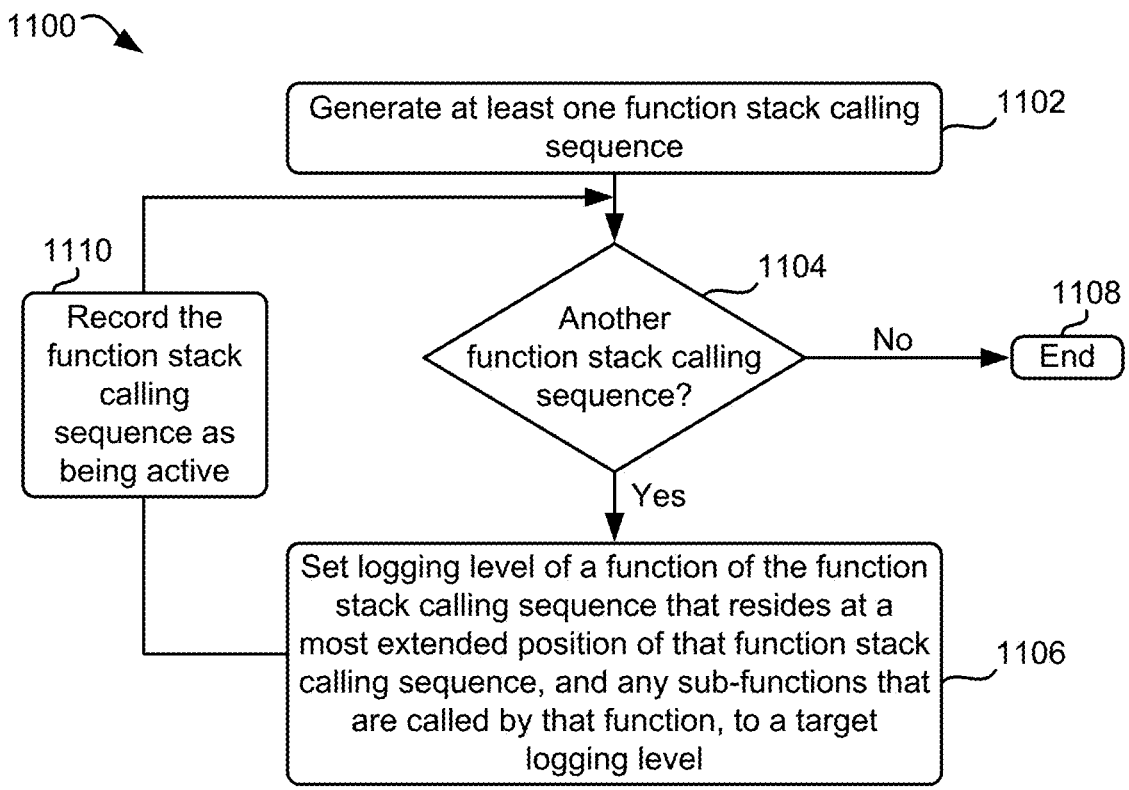
FIG. 11A is a flowchart a method, in accordance with one embodiment.

The logging level of the one or more updated functions may in one approach be adjusted to be a target logging level, e.g., see FIG. 11A. According to another approach, the logging level of the one or more updated functions may be adjusted to be a predetermined default logging level, e.g., see FIG. 11B.

Figure 11B:
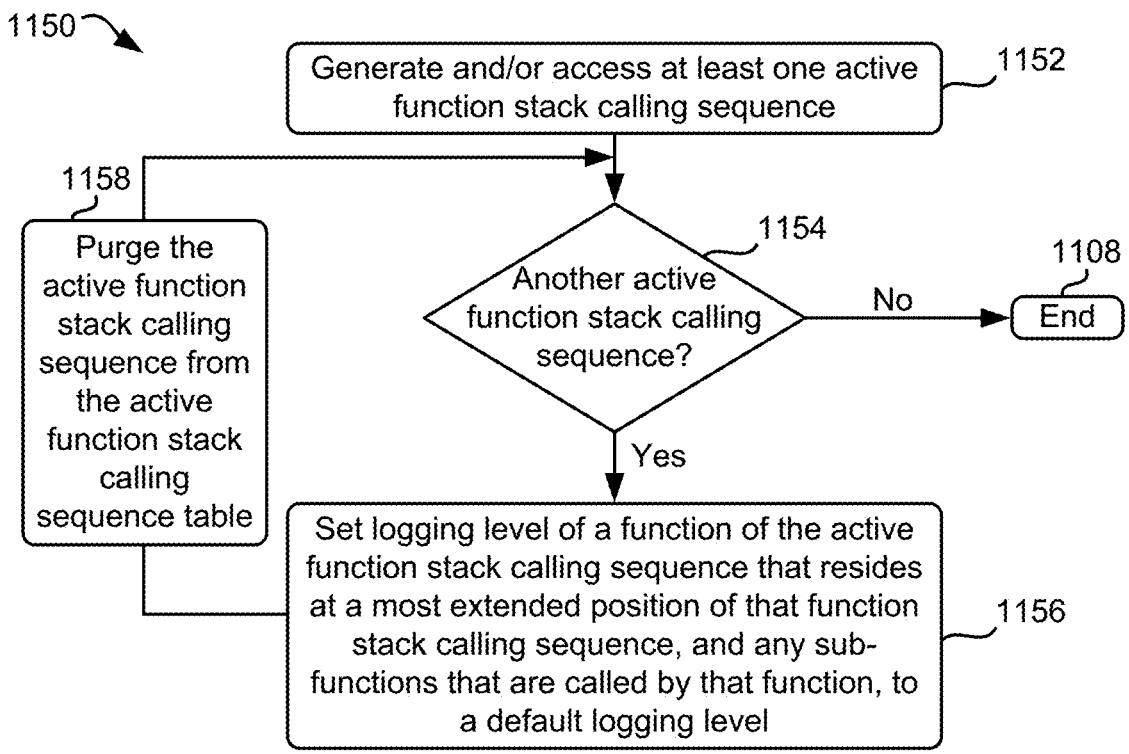
FIG. 11B is a flowchart a method, in accordance with one embodiment.

Now referring to FIGS. 11A-11B, flowcharts of methods 1100, 1150 are shown according to several embodiments. The methods 1100, 1150 may be performed in accordance with the present invention in any of the environments depicted in FIGS. 1-4, 7A-7B, and 10A-10B among others, in various embodiments. Of course, more or less operations than those specifically described in FIGS. 11A-11B may be included in methods 1100, 1150, as would be understood by one of skill in the art upon reading the present descriptions.

Each of the steps of the methods 1100, 1150 may be performed by any suitable component of the operating environment. For example, in various embodiments, the methods 1100, 1150 may be partially or entirely performed by a computer of interconnected systems, or some other device having one or more processors therein. The processor, e.g., processing circuit(s), chip(s), and/or module(s) implemented in hardware and/or software, and preferably having at least one hardware component may be utilized in any device to perform one or more steps of the methods 1100, 1150. Illustrative processors include, but are not limited to, a central processing unit (CPU), an application specific integrated circuit (ASIC), a field programmable gate array (FPGA), etc., combinations thereof, or any other suitable computing device known in the art.

It should be noted that some similar operations of methods 1100, 1150 may share common numbering.

Operation 1102 of method 1100 includes generating at least one function stack calling sequence. As mentioned elsewhere herein, each function stack calling sequence may be used for adjusting the logging level of a server system, e.g., in order to thereafter prevent called functions of the server system from returning invalid parameters. Decision 1104 includes determining whether any generated function stack calling sequences (FSCSs) have not yet been considered, e.g., see that method 1100 loops from operation 1106 to decision 1104 until each of the one or more generated function stack calling sequences have been considered. In response to a determination that at least one generated function stack calling sequence has not yet been considered (as illustrated by the "Yes" logical path extending from decision 1104), method 1100 continues to operation 1106. Operation 1106 includes setting a logging level of a function of the function stack calling sequence that resides at a most extended position of that function stack calling sequence, and any sub-functions that are called by the that function, to a target logging level. In other words, in the current approach, the function stack calling sequence may be constituted by the function path from service entry function to the function in which the invalid parameter is modified (created/updated). The function in which the invalid parameter is modified may be located at the bottom of function stack calling sequence and may be regarded as the most extended position (starting from the service entry function). In one approach, such a logging level update is preferably applied to functions starting from the most extended position of the function stack calling sequence to all sub-functions thereof.

In response to a determination that each of the generated function stack calling sequences have been considered (as illustrated by the "No" logical path extending from decision 1104) the method 1100 may end, e.g., see operation 1108.

In some approaches, each function stack calling sequence that has a logging behavior updated to a target logging level may be recorded as being active, e.g., see operation 1110. According to one specific approach, the recording may be stored within a table that is known to the server system. The recording of an active logging level may represent/flag that the logging level of the logging behavior is currently greater (relatively greater verbosity of logging) than a default logging level, e.g., in response to detection of an invalid parameter name. As will now be described below, e.g., see FIG. 11B, this logging level may be returned to the default logging level at any time, e.g., in response to a receiving a determination that parameter(s) output by the server system are valid, in response to a predetermined amount of time elapsing, etc.

As illustrated in FIG. 11B, according to some other approaches, the logging level of the one or more functions of a function stack calling sequence that have previously been recorded as being active may be adjusted to be a predetermined default logging level. For example, operation 1152 of method 1150 includes generating and/or accessing at least one active function stack calling sequence. Decision 1154 includes determining whether any of the active function stack calling sequences have not yet been considered, e.g., see that method 1150 loops from operation 1152 to decision 1104 until each of the one or more generated function stack calling sequences have been considered. In response to a determination that at least one generated function stack calling sequence has not yet been considered (as illustrated by the "Yes" logical path extending from decision 1154), method 1150 continues to operation 1156. Operation 1156 includes setting a logging level of a function of the active function stack calling sequence that resides at a most extended position of that function stack calling sequence, and any sub-functions that are called by that function, to a default logging level. In one approach, the performing of operation 1156 may depend on the count of a predefined counter. In such an approach, each active function stack calling sequence may have a predefined count assigned thereto, that is added to each time that a sub-function is called. Accordingly, in one approach, the performing of operation 1156 on a given function of an active function stack calling sequence may depend on the count of the active function stack calling sequence being greater than a predefined number.

Subsequent setting a logging level of a function of the active function stack calling sequence that resides at a most extended position of that function stack calling sequence, and any sub-functions that are called by that function, to a default logging level, the active function stack calling sequence may be purged from an active function stack calling sequence table, e.g., see operation 1158 of method 1150. In other words, the now inactive function stack calling sequence may thereafter be applied to method 1100 before being again applied to method 1150.

In response to a determination that each of the generated function stack calling sequences has been considered (as illustrated by the "No" logical path extending from decision 1104) the method 1150 may end, e.g., see operation 1108.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for enabling updating of logging behavior using collaboration within interconnected systems, comprising:
   outputting, from a requester system to a server system, a request signature, wherein the request signature requests at least one parameter of a function specified in the request signature, wherein the specified function exists in a functional topology of the requester system and a functional topology of the server system;
   receiving a first response signature from the server system;
   identifying, within the first response signature, a parameter;
   applying the specified function to the identified parameter for determining whether the identified parameter is valid;
   in response to a determination that the identified parameter of the first response signature is invalid, marking a location and/or an identity of the identified parameter determined to be invalid in a copy of the first response signature;
   using the functional topology of the requester system to trace and/or map the identified parameter determined to be invalid to a valid parameter;
   determine, on the requester system, one or more functions of the functional topology of the server system that use the invalid parameter; and
   outputting, from the requester system to the server system, a second response signature that includes the marked-up copy of the first response signature for updating logging behavior of the server system when the server system thereafter performs the specified function,
   wherein the second response signature includes the one or more functions determined to use the invalid parameter,
   wherein the second response signature is used by the server system to update the logging behavior of the server system based on the one or more functions.

2. The computer-implemented method of claim 1, wherein applying the specified function to the identified parameter for determining whether the identified parameter is valid includes determining whether a context of the identified parameter matches a context of the function specified in the request signature.

3. The computer-implemented method of claim 2, wherein the identified parameter is determined to be invalid in response to a determination that the context of the identified parameter does not match the context of the function specified in the request signature.

4. The computer-implemented method of claim 1, wherein the first response signature includes data organized in a structure, wherein the structure is a concentrated text block, wherein identifying within the first response signature the parameter includes parsing the structured data of the first response signature for a parameter that is associated with the function specified in the request signature or for a parameter that is associated with a different function that exists in a same logical path of the functional topology of the requester system as a logical path of the functional topology of the requester system that the function specified in the request signature exists in.

5. The computer-implemented method of claim 1, wherein the request signature is a callable service, wherein the identified parameter defines an outcome of the callable service.

6. The computer-implemented method of claim 5, wherein the request signature is output to a service endpoint of the server system, wherein the service endpoint is a TCP/IP socket port, wherein the request signature is output to the service endpoint as a serialized data stream.

7. The computer-implemented method of claim 5, wherein the request signature is output to a service endpoint of the server system, wherein the service endpoint is an HTTP URL, wherein the first response signature includes a set of parameters, wherein the set of parameters are formatted within the first response signature in a format of the group of formats consisting of: parameters embedded in a URL string, parameters defined in HTTP headers, and parameters encoded within a predefined parameter format for HTTP body.

8. A computer program product for enabling updating of logging behavior using collaboration within interconnected systems, the computer program product comprising a computer readable storage medium having program instructions embodied therewith, the program instructions readable and/or executable by a computer included in a requester system to cause the computer to:
output, from the computer to a server system, a request signature, wherein the request signature requests at least one parameter of a function specified in the request signature, wherein the specified function exists in a functional topology of the requester system and a functional topology of the server system; receive, by the computer, a first response signature from the server system; identify, by the computer, within the first response signature, a parameter; apply, by the computer, the specified function to the identified parameter for determining whether the identified parameter is valid, in response to a determination that the identified parameter of the first response signature is invalid, mark, by the computer, a location and/or an identity of the identified parameter determined to be invalid in a copy of the first response signature;
use, by the computer, the functional topology of the requester system to trace and/or map the identified parameter determined to be invalid to a valid parameter;
determine, by the computer, one or more functions of the functional topology of the server system that use the invalid parameter; and output, from the computer to the server system, a second response signature that includes the marked-up copy of the first response signature for updating logging behavior of the server system when the server system thereafter performs the specified function, wherein the second response signature includes the one or more functions determined to use the invalid parameter; and program instructions to update the logging behavior of the server system using the second response signature.

9. The computer program product of claim 8, wherein the identified parameter is determined to be invalid in response to a determination that a mandatory parameter is missing from the identified parameter.

10. The computer program product of claim 8, wherein the first response signature includes data organized in a structure, wherein identifying within the first response signature the parameter includes parsing the structured data of the first response signature for a parameter that is associated with the function specified in the request signature or for a parameter that is associated with a different function that exists in a same logical path of the functional topology of the requester system as a logical path of the functional topology of the requester system that the function specified in the request signature exists in.

11. The computer program product of claim 8, wherein the request signature is a callable service, wherein the identified parameter defines an outcome of the callable service.

12. The computer program product of claim 11, wherein the request signature is output to a service endpoint of the server system, wherein the service endpoint is a TCP/IP socket port, wherein the request signature is output to the service endpoint as a serialized data stream.

13. The computer program product of claim 11, wherein the request signature is output to a service endpoint of the server system, wherein the service endpoint is an HTTP URL, wherein the first response signature includes a set of parameters, wherein the set of parameters are formatted within the first response signature in a format of the group of formats consisting of: parameters embedded in a URL string, parameters defined in HTTP headers, and parameters encoded within a predefined parameter format for HTTP body.

14. A system for enabling updating of logging behavior using collaboration within interconnected systems, comprising: a processor one or more processors; and
logic collectively integrated with the one or more processors, collectively executable by the one or more processors, or collectively integrated with and collectively executable by the one or more processors processor, the logic being configured to: output, from a requester system to a server system, a request signature, wherein the request signature requests at least one parameter of a function specified in the request signature, wherein the specified function exists in a functional topology of the requester system and a functional topology of the server system; receive a first response signature from the server system; identify, within the first response signature, a parameter; apply the specified function to the identified parameter for determining whether the identified parameter is valid; in response to a determination that the identified parameter of the first response signature is invalid, mark a location and/or an identity of the identified parameter determined to be invalid in a copy of the first response signature; use the functional topology of the requester system to trace and/or map the identified parameter determined to be invalid to a valid parameter; determine, on the requester system, one or more functions of the functional topology of the server system that use the invalid parameter; and output, from the requester system to the server system, a second response signature that includes the marked-up copy of the first response signature for updating logging behavior of the server system when the server system thereafter performs the specified function, wherein the second response signature includes the one or more functions determined to use the invalid parameter; and cause updating of the logging behavior of the server system based on the one or more functions, using the second response signature.

15. The system of claim 14, wherein applying the specified function to the identified parameter for determining whether the identified parameter is valid includes determining whether a context of the identified parameter matches a context of the function specified in the request signature.

16. The system of claim 14, wherein an invalidity of the identified parameter is determined on an interface specification level, wherein the identified parameter is determined by the requester system to be invalid in response to a determination that the identified parameter includes a type error.

17. The system of claim 14, wherein the first response signature includes data organized in a structure, wherein identifying within the first response signature the parameter includes parsing the structured data of the first response signature for a parameter that is associated with the function specified in the request signature or for a parameter that is associated with a different function that exists in a same logical path of the functional topology of the requester system as a logical path of the functional topology of the requester system that the function specified in the request signature exists in.

18. The system of claim 14, wherein the request signature is a callable service, wherein the identified parameter defines an outcome of the callable service.

19. The system of claim 18, wherein the request signature is output to a service endpoint of the server system, wherein the service endpoint is a TCP/IP socket port, wherein the request signature is output to the service endpoint as a serialized data stream.

* * * * *